Nov. 4, 1952  E. L. WHITE  2,616,945
SERVICE OUTLET BOX FOR TRAILER VEHICLES
Filed Dec. 13, 1950  2 SHEETS—SHEET 1

Inventor
Edwin L. White
By John N. Randolph
Attorney

Nov. 4, 1952                E. L. WHITE                2,616,945
SERVICE OUTLET BOX FOR TRAILER VEHICLES
Filed Dec. 13, 1950                              2 SHEETS—SHEET 2
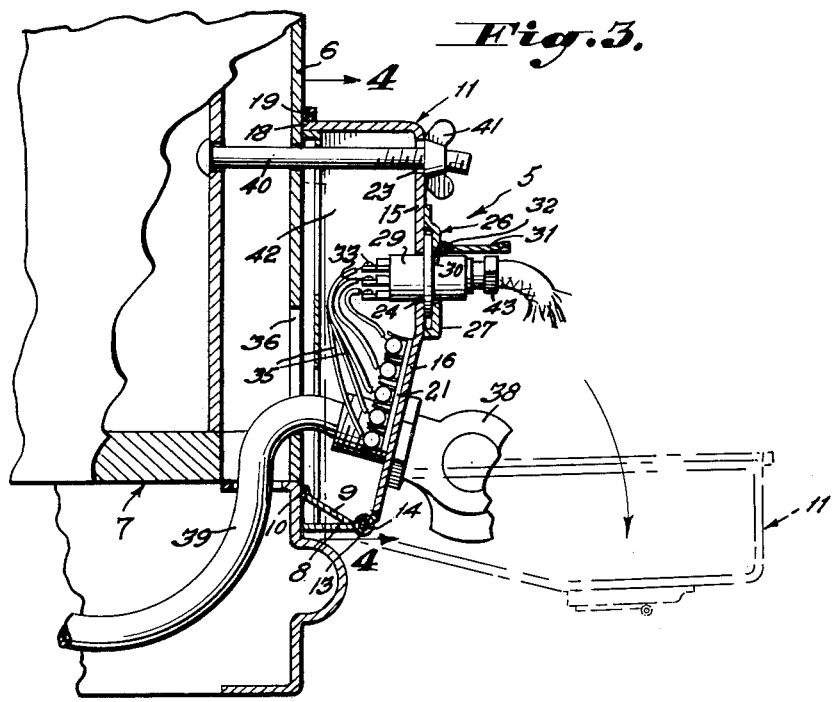
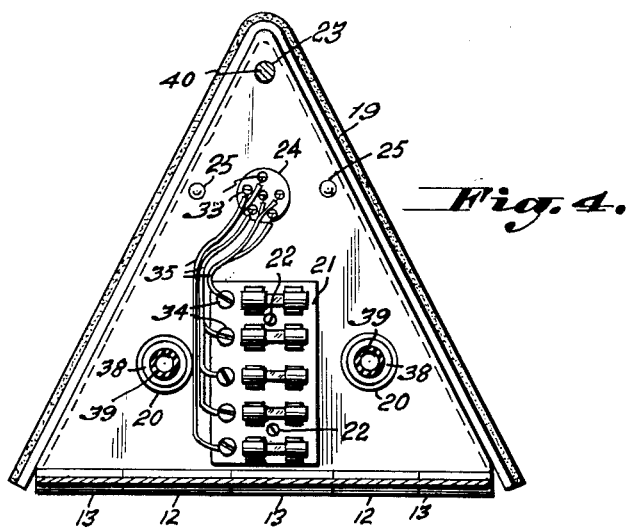
Inventor
*Edwin L. White*
By *John N. Randolph*
Attorney Patented Nov. 4, 1952

2,616,945

UNITED STATES PATENT OFFICE 2,616,945

SERVICE OUTLET BOX FOR TRAILER VEHICLES

Edwin L. White, Atlanta, Ga., assignor to Dorsey Trailers, Inc., Elba, Ala., a corporation of Alabama Application December 13, 1950, Serial No. 200,550

5 Claims. (Cl. 174—52)

This invention relates to a service outlet box primarily intended for use on trailer vans forming a support for all brake and lighting connections of the trailer vehicle to render such connections readily accessible for servicing when necessary and for protecting said connections from dirt and from the elements.

Another object of the invention is to provide a service outlet box which will function as its own cover or closure and which is non-detachably mounted on the trailer vehicle yet capable of being readily moved to an open position so that the parts supported thereby are completely accessible.

A further object of the invention is to provide a device of this character by the use of which the assembly of the brake connections and electrical connections are all grouped in a convenient position externally of a trailer vehicle and in one single location so that no difficulty can be encountered in locating said connections for servicing thereby reducing to a minimum delays due to necessary servicing of such parts.

Various other objects and advantages of the invention will hereinafter become more fully apparent from the following description of the drawings, illustrating a presently preferred embodiment thereof, and wherein:

Figure 3 is a vertical sectional view taken substantially along a plane as indicated by the line 3—3 of Figure 1, and Figure 4 is a vertical sectional view looking toward the inner side of the outlet box, taken substantially along a plane as indicated by the line 4—4 of Figure 3.

Figure 1:
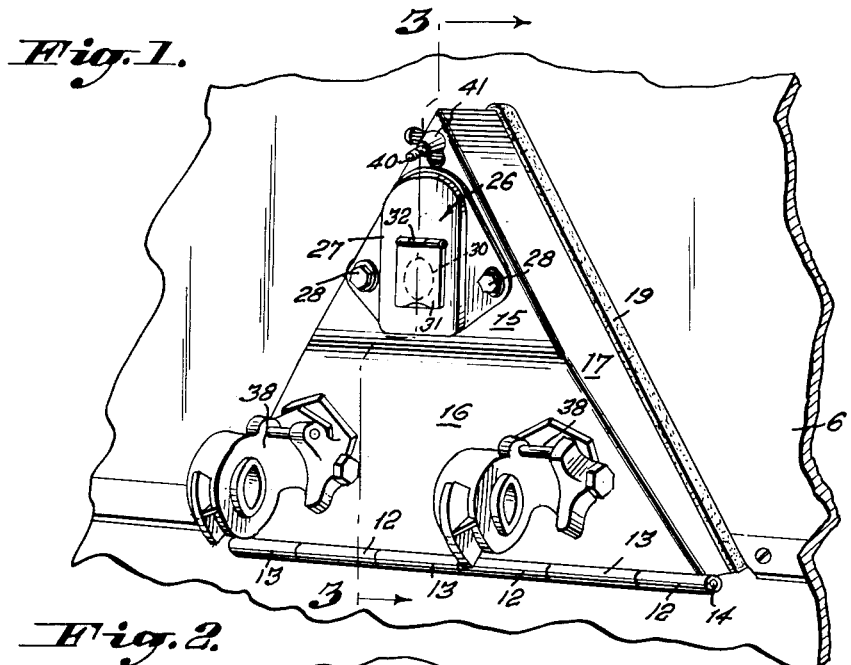
Figure 1 is a perspective view showing the invention applied to a portion of the exterior of a trailer vehicle and in a closed position.
Figure 2:
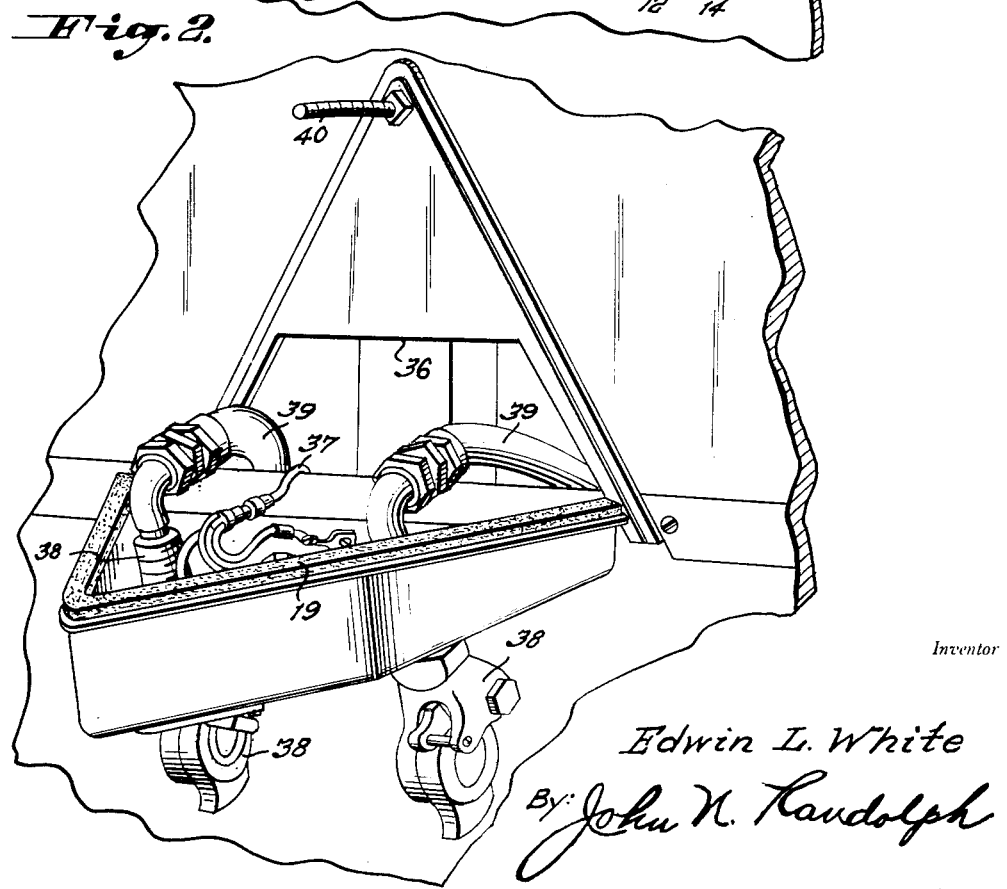
Figure 2 is a view similar to Figure 1 but showing the outlet box in an open position.

Referring more specifically to the drawings, the service outlet box in its entirety and comprising the invention is designated generally 5 and is illustrated in Figures 1 to 3 mounted on an exterior vertical wall portion 6 constituting a part of a trailer vehicle or van, a portion of which has been illustrated in Figure 3 and designated generally 7. The outlet box 5 is preferably mounted on the front wall of the van or trailer vehicle adjacent its bottom edge, as illustrated in Figure 3.

The outlet box 5 includes an elongated bracket or plate 8 which is fixed to the outer surface of the wall 6 along one of its longitudinal edges and which projects outwardly therefrom in substantially a horizontal plane. The bracket 8 may be provided with a brace 9 and said bracket and brace may be secured to the wall 6, as by welding as indicated at 10 in Figure 3.

The outlet box includes a body portion or cover, designated generally 11 having a bottom edge provided with longitudinally spaced hinge barrels 12 which mate with hinge barrels 13 formed on the outer, free edge of the plate or bracket 8. A hinge pin 14 extends through the aligned hinge barrels 12 and 13 for swingably supporting the body member or cover 11 on the bracket 8. The outer wall of the cover 11 includes an upper portion 15 and a lower portion 16 which is disposed at an obtuse angle to the wall portion 15 and which extends upwardly and outwardly from said bracket 8 when the cover or body portion 11 is in a closed position, as seen in Figures 1 and 3. The outer wall 15, 16 is substantially triangular in shape and is provided with complementary side walls 17 which project inwardly therefrom and which extend from adjacent the bottom edge of the wall portion 16, which is provided with the hinge barrels 12 upwardly in converging relationship. Said side walls 17 merge integrally at the upper end or apex of the wall portion 15. The outer or free edge 18 of the side walls 17 is disposed entirely in the same plane but the width of said walls 17 diminish toward the bottom edge of the wall portion 16 to correspond with its oblique disposition relatively to the wall portion 15. A sealing gasket 19, preferably formed of rubber and of channel shaped cross section engages the outer free edge 18 of the side walls 17 from end-to-end thereof and constitutes an uninterrupted sealing member of substantially inverted V-shape in cross section, as seen in Figure 4, the ends of which, together with the lower ends of the edges 18, extend downwardly to or slightly beneath the level of the bracket 8, as seen in Figure 4.

The outer wall portion 16 is provided with laterally spaced openings 20. A fuse block 21 of any conventional construction is secured in any manner, preferably by self tapping metal screws 22, to the inner side of the wall portion 16, between the openings 20. The wall portion 15 is provided adjacent its apex with a small opening 23. Said portion 15, below the opening 23, is provided with a larger opening 24 which is interposed between two laterally spaced openings 25.

A conventional electric socket assembly is mounted on the outer side of the wall portion 15, beneath the opening 23, one conventional type of such electric socket assembly, designated generally 26 is shown in Figures 1, 3 and 4 including a mounting plate 27 which is secured to the outer side of the wall portion 15 by fastenings 28 and which contains an electric socket 29 which extends inwardly through the opening 24 and is supported in said opening by the wall portion 15 and plate 26. The plate 26 is provided with an opening 30 which aligns with the socket 29. Opening 30 is normally closed by a cover plate 31, illustrated as the type which is hinged to the outer side of the plate 26 above the opening 30 by a spring hinge 32 which normally urges the cover plate 31 downwardly to a closed position. However, other types of electric socket assemblies may be mounted on the wall portion 15 including those having a sliding closure in lieu of the hinge closure 31.

The contacts 33 of the socket 29 are connected to the contacts 34 of the fuse block 21 by electrical conductors 35. The various electrical fixtures, not shown, of the trailer vehicle or van 7 are connected to the socket 29 through the fuse block 21 in a conventional manner by electrical conductors 37, as seen in Figure 2, which extend through an opening 36 in the van wall 6 and which are provided with ample slack so that the body portion or cover 11 may be swung from its position of Figure 1 downwardly to its open position of Figure 2.

A pair of conventional brake connections 38 is secured to the wall portion 16, each extending through one of the openings 20 thereof. The inner ends of the brake connections 38 are each connected to a brake hose 39 which projects therefrom through the opening 36. The hoses 39 likewise have sufficient slack to permit the cover 11 to be swung downwardly to its open position of Figure 2. The opposite ends of the brake connections 38, disposed externally of the cover 11 are adapted to be coupled to mating brake connections, not shown, of a draft vehicle. The brake connections 38 are of conventional construction and have been illustrated as of the high pressure air type; however, other types of conventional brake connections such as those employed with a vacuum brake system may equally well be supported in the same manner on the cover 11.

A bolt 40 is anchored to and projects outwardly from the wall portion 6 and extends outwardly through the opening 23 when the cover 11 is in a closed position, as seen in Figures 1 and 3. A wing nut 41 threadedly engages the threaded terminal portion of the bolt 40 and is tightened against the wall portion 15 to hold the cover member 11 in a closed position and with the gasket 19 pressed against the outer side of the wall portion 6 so that said wall portion and cover member 11 combine to form the service outlet box having a chamber 42 in which the fuse block 21 and the inner ends of the socket 29 and brake connections 38 are housed and which is sealed except for the opening 36 which opens inwardly of the van 7 so that said parts are protected from the elements and from dirt or other foreign matter.

From the foregoing it will be readily apparent that brake connections, not shown, from a draft vehicle may be readily coupled to the outer ends of the brake connections 38 and the closure 31 may be elevated so that an electric plug 43, leading from the current source, not shown, of a draft vehicle may be inserted through the opening 30 and engaged with the socket 29 for providing an electrical connection to each of the electric fixtures of the trailer vehicle or van 7, both of which operations can be accomplished with the cover 11 in a closed position. In the event that servicing of any of the parts supported by the cover 11 are required, the nut 41 can be removed releasing the cover so that it can be swung outwardly and downwardly on its hinge 12, 13, 14 to an open, substantially horizontal position as seen in Figure 2, thus affording full and ready access to the parts supported on the inner side of the cover 11 for any servicing and repair required. It will likewise be apparent that no part of the outlet box 5 can be lost should the attendant inadvertently fail to secure the cover in a closed position after servicing of the parts.

Various modifications and changes are contemplated and may obviously be resorted to, without departing from the spirit or scope of the invention as hereinafter defined by the appended claims.

I claim as my invention:

1. A service outlet box for a trailer vehicle comprising a vehicle wall portion, a cover and a bracket, said bracket being fixed to and projecting outwardly from said vehicle wall portion, the cover including an outer wall having a bottom edge, said cover being hingedly connected at its bottom edge to the outer edge of said bracket for swinging movement from an upright, closed position outwardly and downwardly to an open position, said cover having side walls extending inwardly from its outer wall and engaging said vehicle wall portion and combining with said vehicle wall portion, the bracket and cover to form a housing, fastening means secured to and projecting from said vehicle wall portion through the cover and detachably retaining the cover in a closed position against the vehicle wall portion, an electric socket mounted in the outer wall of said cover and opening outwardly thereof and adapted to be detachably connected to an electric plug, flexible connectors for electric fixtures of the trailer vehicle connected to the inner end of said socket, brake couplings connected to and extending through the outer wall of the cover, flexible hoses extending from and connected to the inner ends of said brake connectors, and said vehicle wall portion having an opening through which the hoses and flexible connectors loosely extend.

2. A service outlet box as in claim 1, a sealing gasket of channel-shape cross section engaging the free edges of the side walls of the cover and clamped between the cover side walls and said wall portion of the trailer when the cover is secured in a closed position for sealing the interior of the cover.

3. A service outlet box as in claim 1, a sealing gasket of channel-shape cross section engaging the free edges of the side walls of the cover and clamped between the cover side walls and said wall portion of the trailer when the cover is secured in a closed position for sealing the interior of the cover, said side walls having upwardly converging corresponding portions merging at the top of the cover and extending downwardly therefrom and overlapping the ends of said bracket at the lower ends of said cover side walls.

4. A service outlet box for trailers having an outer wall and a pair of side walls extending inwardly from the outer wall, said side walls converging toward and merging at an upper end of the outer wall, a bracket plate secured to and projecting outwardly from a wall of the trailer, the opposite lower end of the outer wall being pivotally connected to the outer edge of the bracket plate for swingably supporting the box on the outer side of the trailer wall, said bracket plate closing the bottom of the box and being disposed between the opposite ends of the side walls when the box is in a closed position, means detachably connecting said box at its upper end to the trailer wall, said box having an open side held in engagement with said trailer wall and closed thereby when connected to said means, said box being adapted to support brake and electrical connections in protected positions therein when the box is maintained in a closed position by said means, and said box being swingable downwardly and outwardly to an open position to expose the brake and electrical connections for servicing when disengaged from said means.

5. A service outlet box for trailers adapted to support brake and electrical connections in protected positions, comprising an upright trailer wall portion forming an inner wall of the box, a bracket plate secured to and extending outwardly from said wall portion constituting a stationary bottom of the box, and a movable box section consisting of an outer wall and a pair of side walls secured to the outer wall, said side walls merging at one end of the outer wall, the opposite end of the outer wall being pivotally connected to the outer edge of the bracket plate for swinging movement of the movable box section outwardly and downwardly away from said trailer wall portion to an open position and upwardly toward said trailer wall portion to a closed position, said side walls having edges engaging said trailer wall portion when the movable box section is in a closed position, and said bracket plate being disposed between diverging lower ends of the side walls.

EDWIN L. WHITE.

REFERENCES CITED

The following references are of record in the file of this patent:

UNITED STATES PATENTS

| Number | Name | Date |
|---|---|---|
| 896,854 | Parsons | Aug. 25, 1908 |
| 1,169,187 | Pearl et al. | Jan. 25, 1916 |
| 1,176,515 | Bissell et al. | Mar. 21, 1916 |
| 1,526,870 | Sampson | Feb. 17, 1925 |
| 2,379,226 | Frey | June 26, 1945 |

FOREIGN PATENTS

| Number | Country | Date |
|---|---|---|
| 114,054 | Great Britain | Mar. 21, 1918 |